June 16, 1959   K. J. HARRIS ET AL   2,890,603
TRACTOR TRANSMISSON-DELUXE
Filed Dec. 6, 1957   8 Sheets-Sheet 1
FIG. 1
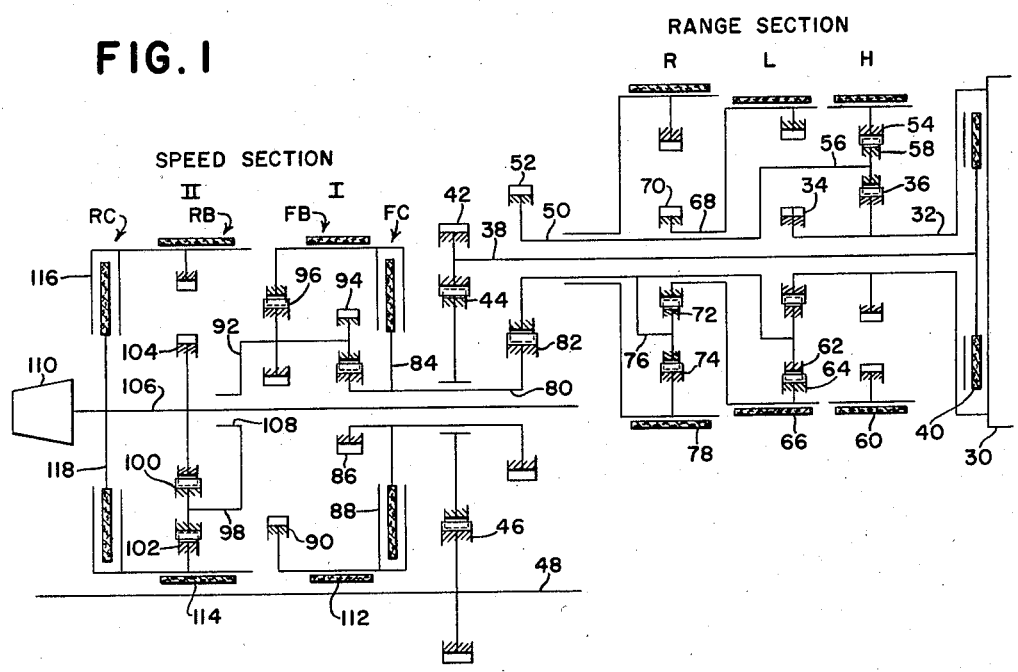
UNITS ENGAGED
| SPEED | REAR CLUTCH | REAR BRAKE | FRONT BRAKE | FRONT CLUTCH | REVERSE BRAKE | LOW BRAKE | HIGH BRAKE |
|---|---|---|---|---|---|---|---|
| 1 | X | | X | | | X | |
| 2 | X | | X | | | | X |
| 3 | X | | | X | | X | |
| 4 | X | | | X | | | X |
| 5 | | X | X | | | X | |
| 6 | | X | X | | | | X |
| 7 | | X | | X | | X | |
| 8 | | X | | X | | | X |
| 1R | X | | X | | X | | |
| 2R | X | | | X | X | | |
| 3R | | X | X | | X | | |
| 4R | | X | | X | X | | |
SPEED SECTION                                      RANGE SECTION
FIG. 2
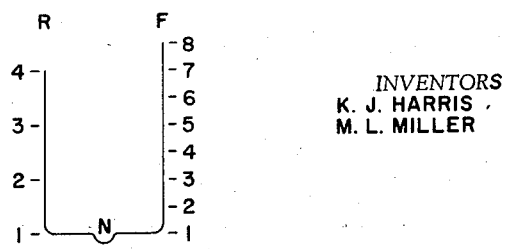
FIG. 21
INVENTORS
K. J. HARRIS
M. L. MILLER

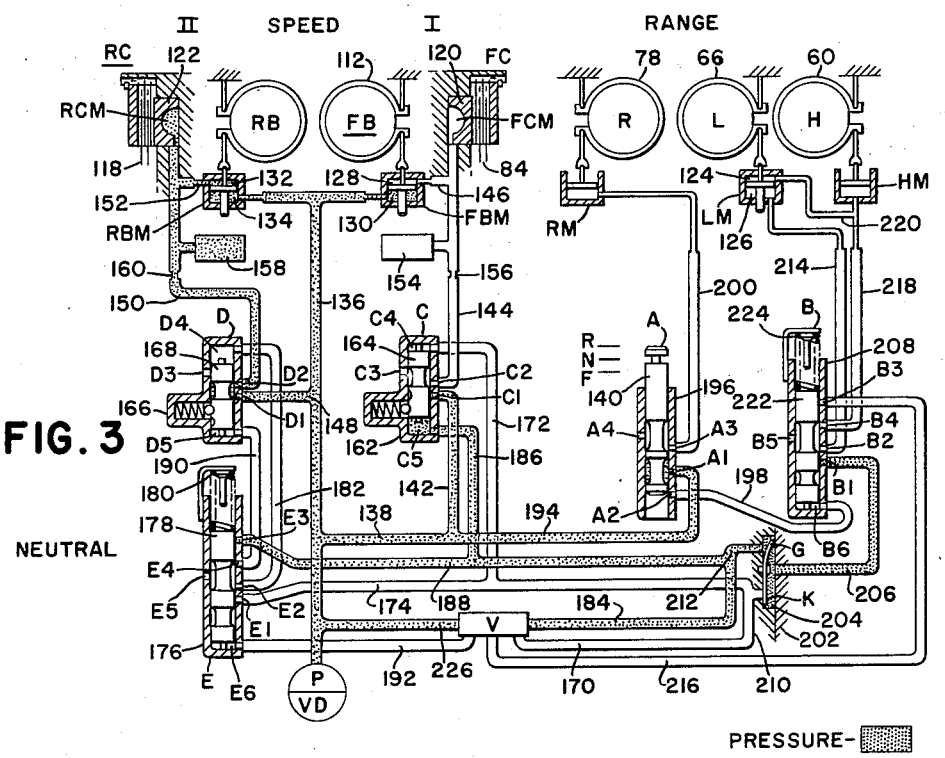
FIG. 3 NEUTRAL
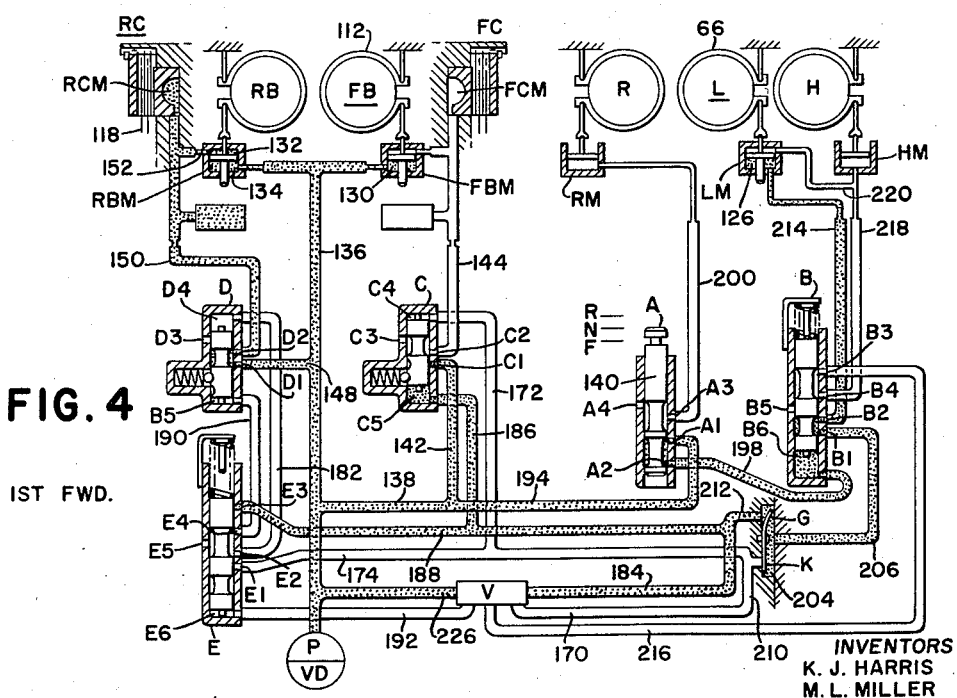
FIG. 4 1ST FWD.

2ND FWD.

3RD FWD.

INVENTORS
K. J. HARRIS
M. L. MILLER

4TH FWD

5TH FWD

INVENTORS
K. J. HARRIS
M. L. MILLER

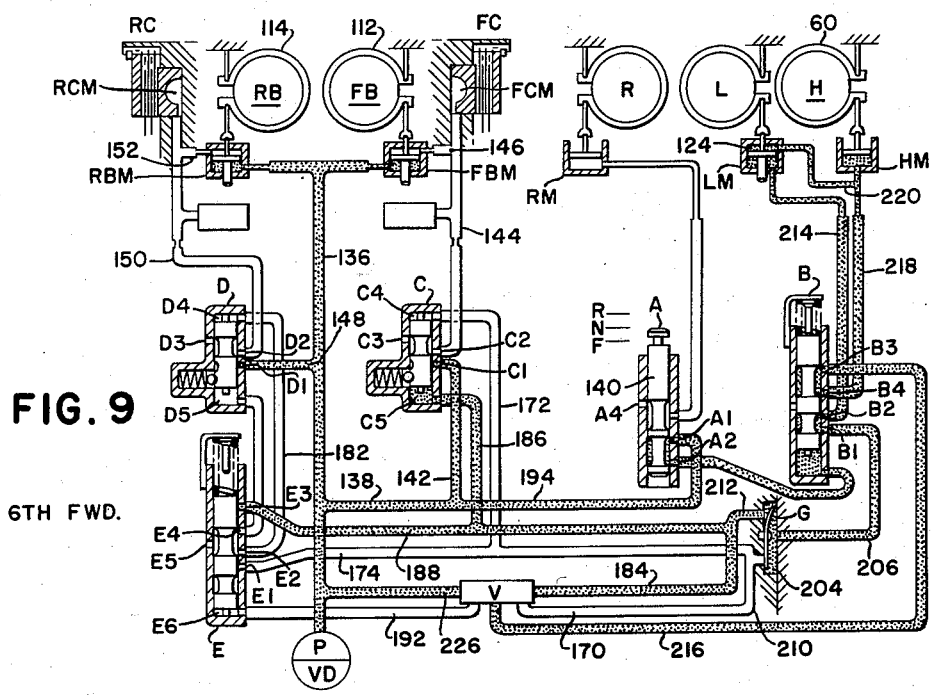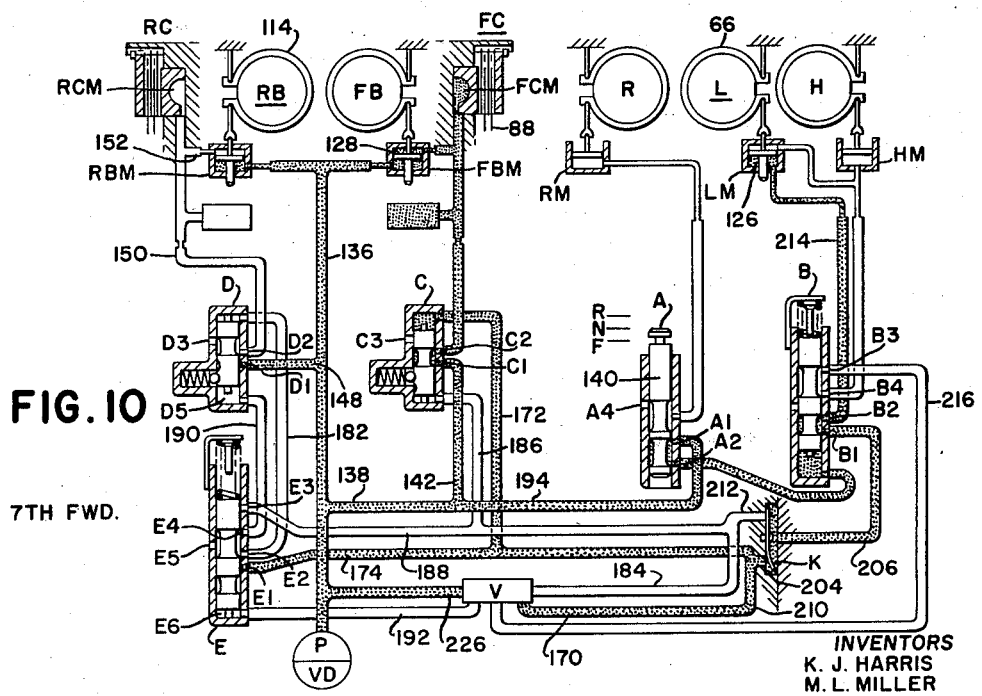

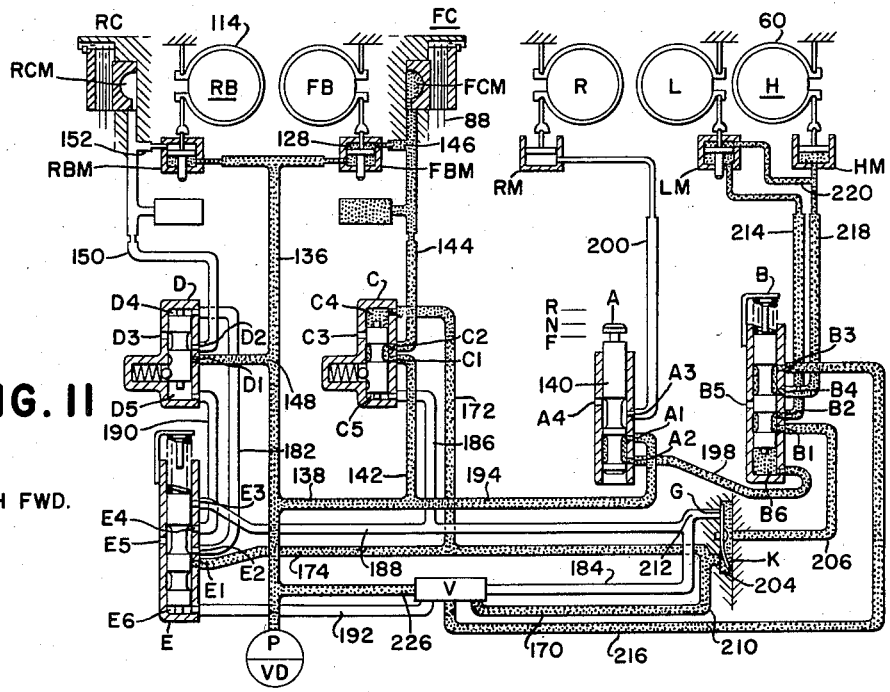
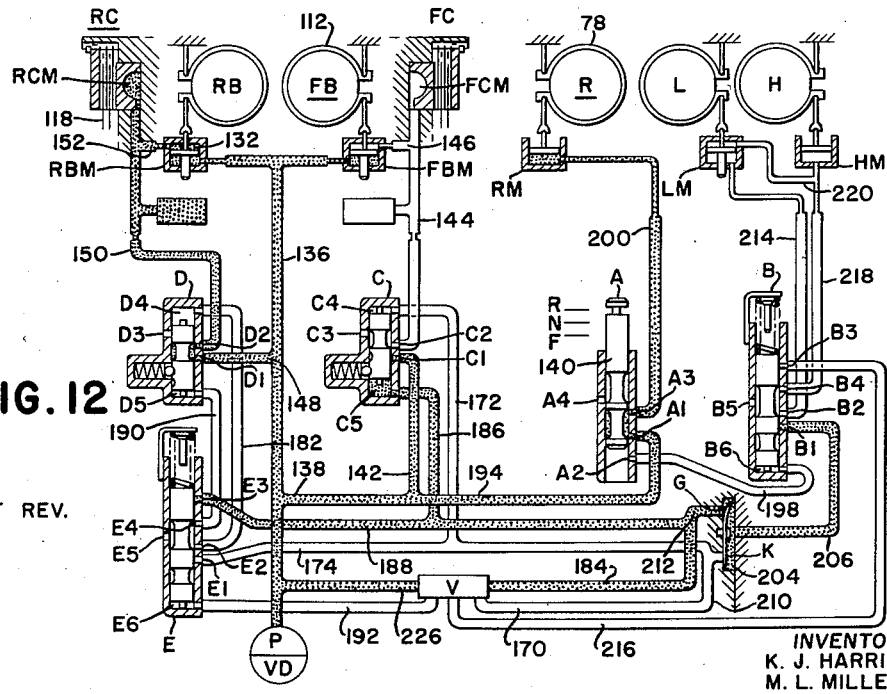

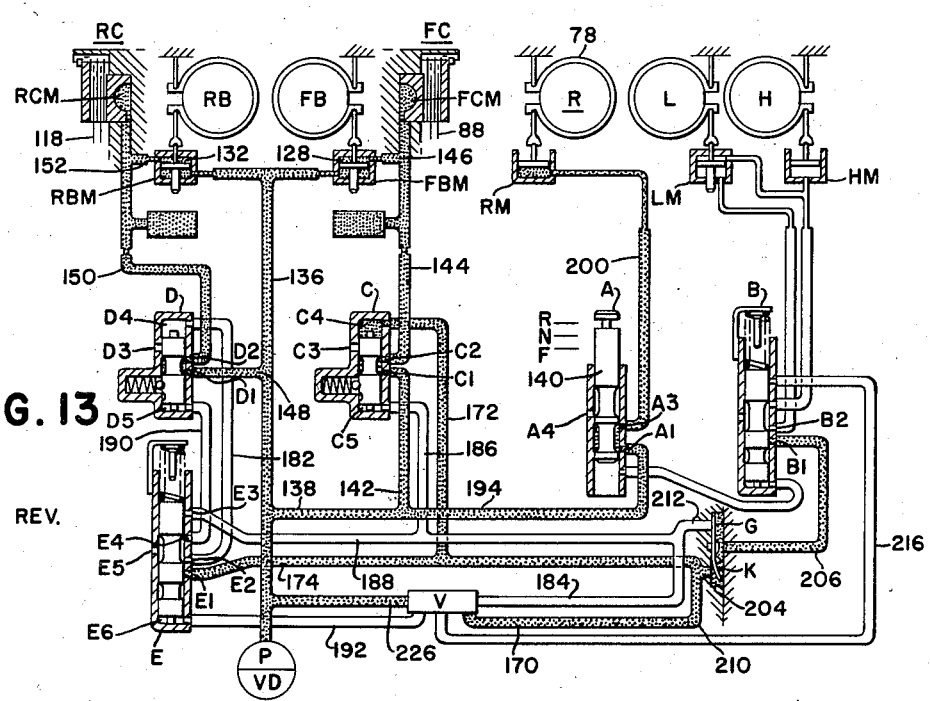
FIG. 13 — 2ND REV.
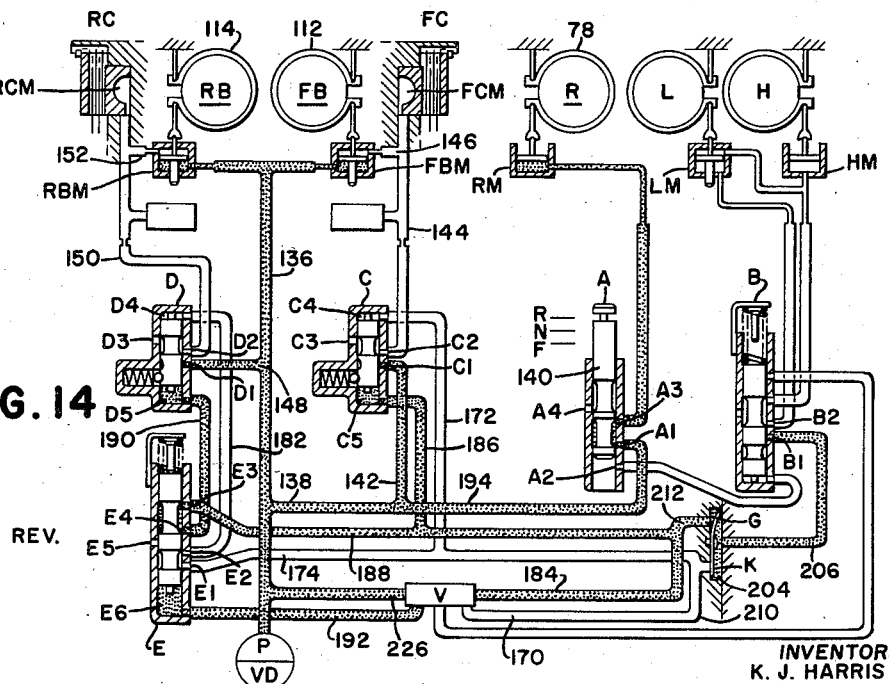
FIG. 14 — 3RD REV.
INVENTORS
K. J. HARRIS
M. L. MILLER

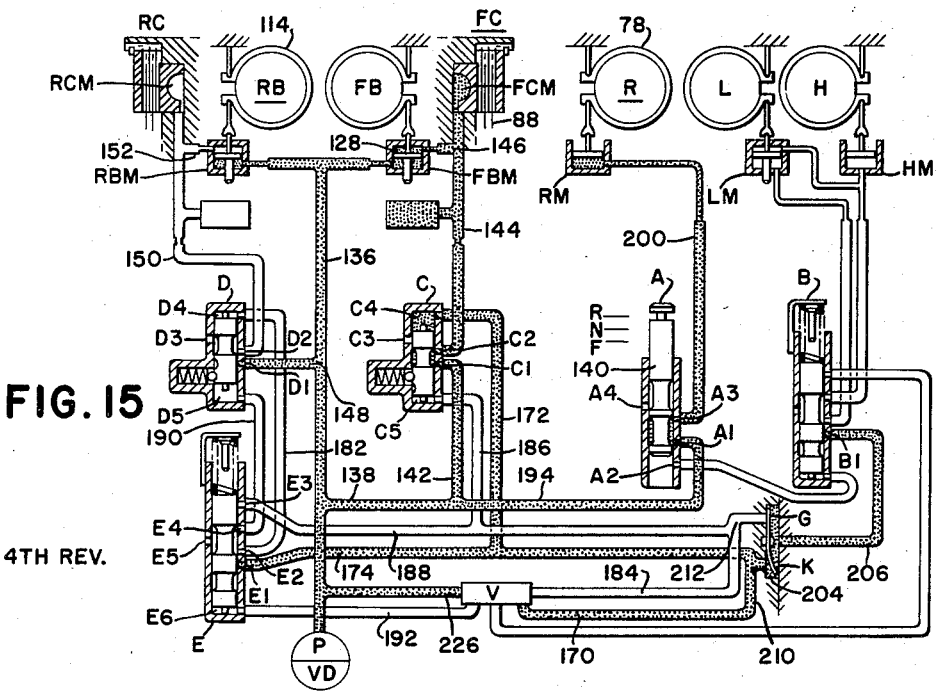

United States Patent Office 2,890,603
Patented June 16, 1959

2,890,603

TRACTOR TRANSMISSION-DELUXE

Kenneth J. Harris and Merle L. Miller, Waterloo, Iowa, assignors, by mesne assignments, to Deere & Company, a corporation of Delaware Application December 6, 1957, Serial No. 701,083

15 Claims. (Cl. 74—740)

This invention relates to a change speed transmission and improved selective control means therefor.

It is a principal object of the invention to provide a change speed transmission of the multi-range multi-speed type, comprising serially connected range and speed sections, the latter of which produces a plurality of speeds and the former of which doubles the speeds forward and provides the same speeds in reverse, or variations thereof. A further object of the invention resides in the provision of improved hydraulic control means facilitating shifting of the transmission among its several speeds, the preferred embodiment including eight speeds forward and four in reverse, in which respect the improved control means features the accomplishment of shifting with a minimum of clutch and brake engagement.

A still further object of the invention resides in novel valving means utilizing a minimum number of movable valves and incorporating in the valve groups several hydraulically controlled valves that are automatically responsive to manual selection. A still further object involves the provision of a sequential main control valve, preferably of the rotary type, enabling progressive shifting from first through eighth and the reverse thereof. The invention features novel provision for accommodating multiple clutch and multiple brake engagement in the intermediate ranges.

The foregoing and other important objects and desirable features inherent in and encompassed by the invention will become apparent as a preferred embodiment thereof is disclosed in detail in the ensuing description and accompanying sheets of drawings, the several figures of which are described immediately below.

Fig. 1 is a schematic sectional view of the transmission.

Fig. 2 is a chart showing the components engaged for the respective speeds.

Fig. 3 is a schematic view, partly in section, showing the transmission and its controls when neutrally positioned.

Figure 5:
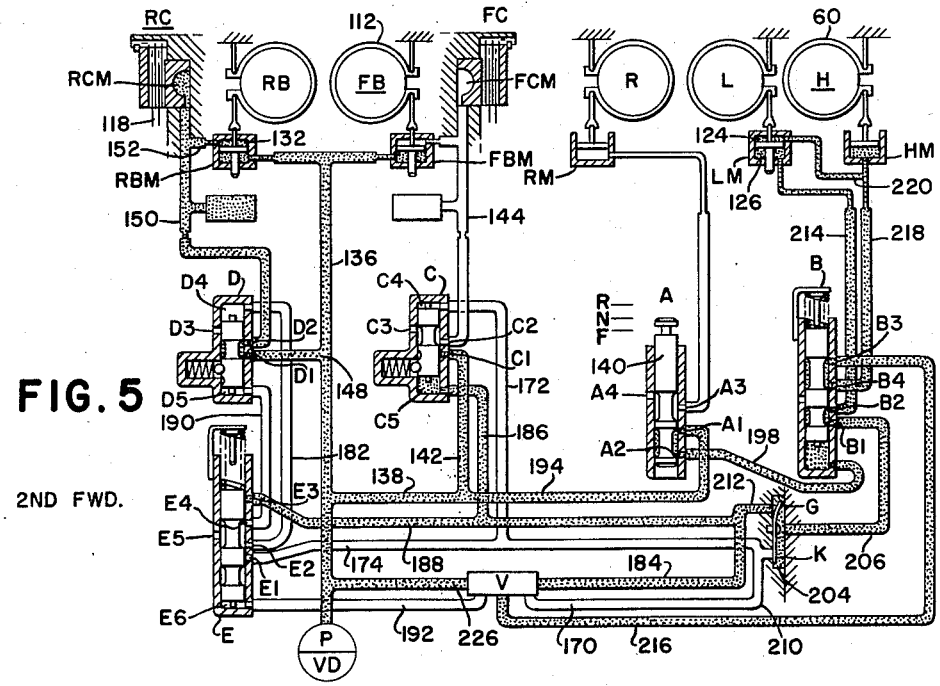
Figure 6:
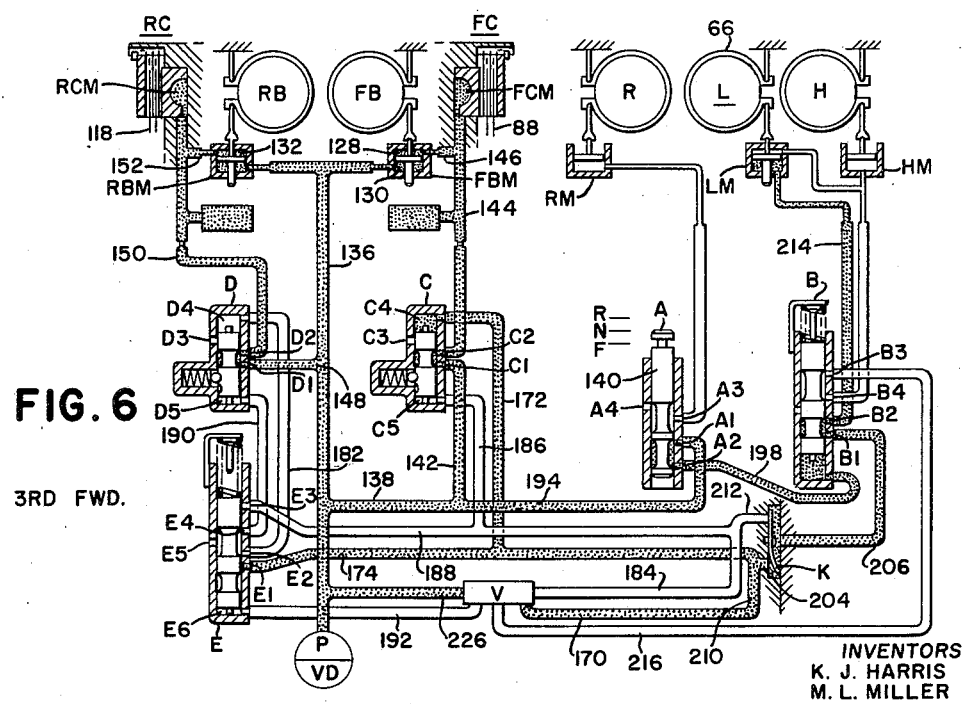
Figure 7:
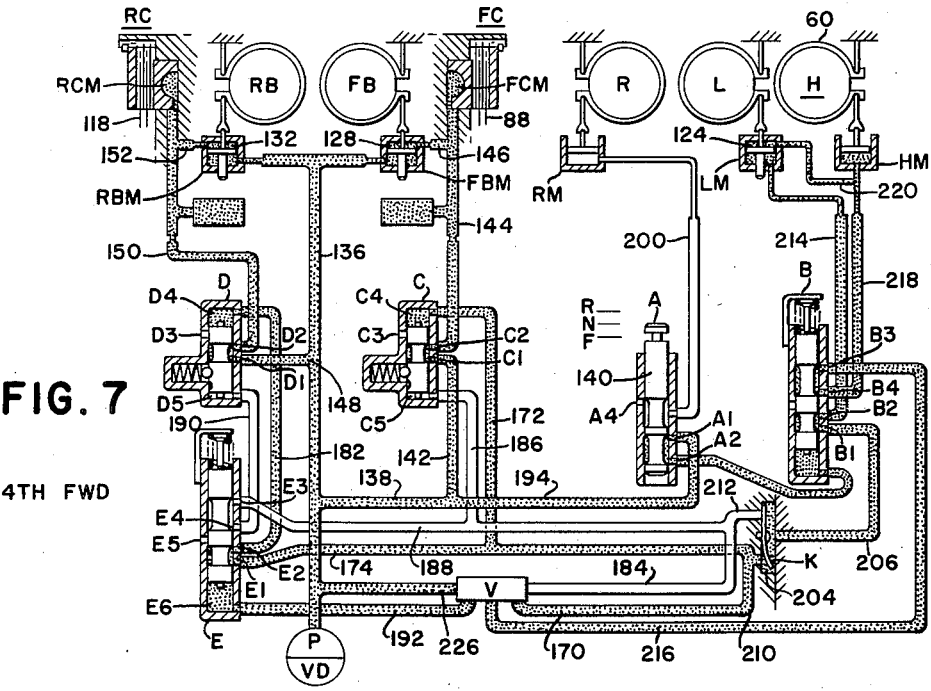
Figure 8:
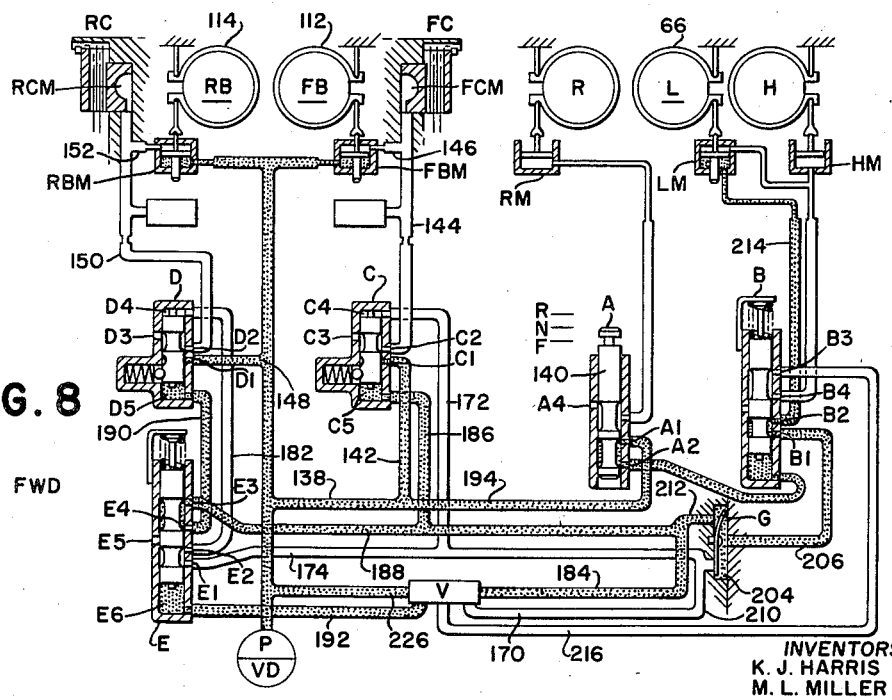

Fig. 4 illustrates the production of first speed forward.
Fig. 5 illustrates second speed forward.
Fig. 6 illustrates third speed forward.
Fig. 7 illustrates fourth speed forward.
Fig. 8 illustrates fifth speed forward.
Fig. 9 illustrates sixth speed forward.
Fig. 10 illustrates seventh speed forward.
Fig. 11 illustrates eighth speed forward.
Fig. 12 illustrates first speed reverse.
Fig. 13 illustrates second speed reverse.
Fig. 14 illustrates third speed reverse.
Fig. 15 illustrates fourth speed reverse.

Fig. 16 is a sectional view on an enlarged scale, showing the control valve and its housing.

Figs. 17 through 20 are sections respectively on the lines, 17—17, 18—18, 19—19 and 20—20 on Fig. 16.

Fig. 21 is a schematic illustration of a preferred shift pattern.

As best shown in Fig. 1, the transmission comprises a range section and a speed section, so designated, and both sections include units of the planetary type. The numeral 30 represents the flywheel, for example, of an internal combustion engine and to this flywheel is fixed an input shaft 32 which has keyed thereto a small sun gear 34 and a large sun gear 36. The shaft 32 is tubular and through this shaft extends a power take-off drive shaft 38 connectible to and disconnectible from the flywheel 30 via a plate clutch 40. A pinion 42 keyed to the rear end of the drive shaft 38 is in constant mesh with a gear 44 which in turn is in constant mesh with a power take-off output gear 46 which is keyed to a power take-off shaft 48. At this point, it should be noted that the expressions "front" and "rear" are used in the interests of convenience and clarity and are not intended to import into the invention limitations not otherwise required.

The range section includes what may be considered three range units or elements, comprising a high planetary element H, a low planetary element L and a reverse planetary element R, the input of which is developed from the input shaft 32 via the sun gears 34 and 36 and the output shaft of which is constituted by a tubular shaft 50 coaxial with the input shaft 32 and carrying an output pinion 52. The high planetary element comprises, in addition to the sun gear 36, an internal ring gear 54, a planet pinion carrier 56 and a plurality of planet pinions, one of which is shown at 58, in mesh between the sun gear 36 and the ring gear 54. The ring gear is selectively brakeable and releasable by an engageable device in the form of a brake band 60 normally biased to a released position as is conventional.

The low planetary element comprises the carrier 56, a plurality of planet pinions, one of which is shown at 62, and an internal ring gear 64, the pinions 62 being in constant mesh between the small sun gear 34 and the ring gear 64. The ring gear is selectively brakeable and releasable by an engageable device in the form of a brake band 66 normally biased to a released position.

The ring gear 64 of the low element L continues as an integral hub 68 to which is coaxially affixed a sun gear 70 in constant mesh with a planet pinion 72 which also is in constant mesh with a reverse ring gear 74.

The planet pinion 72, of which there may be several, is journaled on a carrier 76 which is rigidly affixed to the output shaft 50. The ring gear 74 is selectively brakeable and releasable by an engageable device in the form of a reverse brake band 78, normally biased to a released position.

As will be seen from the description thus far, the input shaft 32 is constantly driven by the engine flywheel 30 and when all bands 60, 66 and 78 are released, the output shaft 50 is idle. Low range is established by tightening the low range band 66, which thereupon immobilizes the low range ring gear 64, and the output shaft 50 is driven from the sun gear 34, planet pinion 62 and carrier 56 at a range ratio determined by the characteristics of the gearing involved.

Operation of the range section in high range is established by engaging only the high range brake band 60, thus immobilizing the high range ring gear 54 so that the output shaft 50 is driven via the large sun gear 36, planet pinion 58 and carrier 56, which carrier is secured to the output shaft 50 as shown.

Reverse in the range section is produced as follows: With all bands 60, 66 and 78 released, the carrier 56, being connected to the static load via the output shaft 50 and output shaft pinion 52, is stationary and the sun gears 34 and 36, rotating with the constantly driven input shaft 32, drive the planet pinions 58 and 62 in a clockwise direction as seen from the front of the vehicle. Since the carrier 56 is not rotating at this time, driving of the pinions as aforesaid causes the low speed ring gear to rotate clockwise which, of course, carries the reverse sun gear 70 also clockwise. This sun gear drives the reverse planet pinion 72 counterclockwise. When the reverse band 78 is applied, the planets 72 "walk" clockwise around the reverse ring gear 74 and drive the carrier 56 and output shaft 50 clockwise, whereas in the forward ranges (low and high) the output shaft 50 is driven in a counterclockwise direction, this being a peculiarity of the present construction in which the input shaft 32 rotates normally counterclockwise. It will be further understood, of course, that the range bands 60, 66 and 78 are applied individually or one at a time.

The speed section of the transmission comprises front and rear units I and II respectively, and these two units are capable of producing four basic speed rations. These speed ratios may be doubled in the forward direction by selective application of the high and low range elements and may be used in reverse by selective application of the reverse element R.

The front unit I is serially connected to the output shaft 50 and is also serially connected to the rear section II. The serial connection between the output shaft 50 and the front unit I is effected by an input shaft 80 to which is keyed a pinion 82 in constant mesh with the output shaft pinion 52. The shaft 80 is tubular and has fixed thereto a clutch plate 84 and a pinion 86. The clutch plate 84 is selectively engageable with and disengageable from clutch plates 88 on a front unit ring gear 90, the clutch plates 84—88 thus constituting a front clutch. For purposes of convenience, the front clutch will hereinafter be designated FC.

The front unit I comprises a carrier 92 which journals a small pinion 94, in constant mesh with the sun gear 86, and a larger planet pinion 96 in constant mesh with the ring gear 90. The carrier 92 serves also as a carrier 98 for the rear unit II and this carrier part 98 carries a plurality of planet pinions, only one of which is shown at 100, in constant mesh with a rear unit ring gear 102 and a final drive sun gear 104 which is coaxially keyed to a final drive shaft 106. As previously stated, the input shaft for the speed section, at 80, is tubular, and this shaft thus accommodates the coaxial disposition of the final drive shaft 106. The carrier structure 92—98 has a tubular hub 108 through which the shaft 106 extends. The numeral 110 designates a bevel pinion on the shaft 106, suggesting but not showing the meshing of this pinion with a conventional bevel ring gear, for example.

The front unit ring gear 90 is in the form of a drum encircled by a selectively engageable and releasable device, here a brake band 112, the band and the drum affording a front brake FB. The rear unit ring gear 102 is likewise in the form of a drum encircled by a band 114 which constitutes a rear brake RB, and this drum further has a pair of clutch plates 116 between which is sandwiched a clutch plate 118 keyed to the shaft 106, the arrangement thus constituting a rear clutch RC.

The units I and II in the speed section of the transmission are capable of producing four speeds, the rear unit being of the type operating on the principle of driving the carrier and locking the ring gear by the rear brake RB to produce overdrive of the sun gear, in addition to selective engagement of the rear clutch RC to produce direct drive. The front unit I operates on the principle of engaging the front clutch FC to produce direct drive or engaging the front brake FB to produce underdrive. Consequently, each unit produces two speed ratios and, since the units are serially connected, these are doubled to provide the four speeds. As previously described, these four speeds may in turn be doubled by selective application of the high and low range elements to produce eight forward speeds. The four basic speed ratios may be used to produce four reverse speeds by application of the reverse element R. The nature of the operation is illustrated by the chart in Fig. 2.

For example, the input shaft 80 is constantly driven from the output shaft of the range section via the pinions 52 and 82, thus driving the sun gear 86 in whichever range or direction is selected. When the front brake FB is engaged and the remaining devices FC, RB and RC are released, underdrive will be produced in the front unit as the sun gear drives the carrier 92—98 via the pinion 94—96. If the rear clutch is now engaged, direct drive is produced in the rear section as the carrier structure 92—98, pinion 100, sun gear 104 and rear unit ring gear 102 rotate in unison to drive the final output pinion 110.

While the rear clutch remains engaged, the front brake may be disengaged and the front clutch engaged to produce direct drive in both units, thus establishing a speed higher than that produced by engagement of the front brake FB and rear clutch RC.

If both clutches are now released and both brakes engaged, the front unit will operate in underdrive and the rear unit in overdrive, to produce the next higher speed.

With the rear brake remaining engaged, the front brake is released and the front clutch engaged to produce direct drive in the front unit and overdrive in the rear unit, thus producing the highest speed.

Thus, the production of the four speeds in the speed section is dependent upon the selected application of the four engageable and releasable device FC, FB, RB and RC. These four speeds are used in the reverse, high and low ranges by the utilization of the three additional releasable and engageable devices comprising the bands 60, 66 and 78. In order to assure smooth and accurate shifting, it is desirable that these bands be applied and released, together with application and release of the clutches FC and RC, in an expeditious and orderly manner, and preferably by control means initially effected manually and responsive in some instances automatically to conditions set up by the manual selection. Such control means will now be described.

In Figs. 4 through 15, the engaged devices are indicated by underlining the respective designations. For example, in Fig. 4, showing first speed forward, the letters L, FB and RC are underlined, indicating that these three elements are engaged.

It is a characteristic of the range bands 60, 66 and 78 that they are biased to released positions and are forcibly contracted or engaged respectively by fluid motors HM, LM and RM. Likewise, the speed section clutches and brakes are biased to disenaged positions by any conventional means and are forcibly engaged by a front clutch motor FCM, a front brake motor FBM, a rear brake motor RBM and a rear clutch motor RCM. The details of the clutches FCM and RCM will be apparent from the drawings and need not be described in detail, except to note that each is here shown as being of the type in which a ring, as at 120 for the front clutch motor and at 122 for the rear clutch motor, serves as the piston.

The high and reverse motors HM and RM are of the one-way type, but the low motor LM, the front brake motor FBM and the rear brake motor RBM are of the differential two-way type, being operative selectively in either direction. The motor LM presents a large-area side at 124 and a small-area side at 126. The motor FBM has a large-area side at 128 and a small-area side at 130. A large-area side at 132 and a small-area side at 134 are provided for the rear brake motor RBM.

The motors, together with valves to be described below, are connected to a pressure source, here shown as a pump of the variable displacement type. A pump line 136 extends from the pump and is connected in parallel to the small-area sides 130 and 134 respectively of the front and rear brake motors FBM and RBM for pressurizing these motors to engage the respective brakes FB and RB. The pump is connected by a line 138 to a direction valve A, which has a valve plunger 140 shiftable selectively among three positions, labeled R, N and F for "reverse," "neutral" and "forward." The position of the plunger or spool 140 in valve A determines whether or not a "forward" valve B functions. This valve B controls the high and low motors HM and LM when valve A is in its F position. Valve A when in its R position controls the reverse motor RM.

A fluid line 142 leads from the pump line 138 to a front shift valve C and continues thence as a line 144 to the front clutch motor FCM, having a branch 146 leading in parallel to the large-area side 128 of the front brake motor FBM. A short line 148 leads off from the pump line 136 to a rear shift valve D and continues from the shift valve as a line 150 to the rear clutch motor RCM, having a parallel branch 152 to the large-area side 132 of the rear brake motor RBM. The shift valves C and D are selectively and respectively openable and closeable to open and close the lines 142—144 and 148—150. The line 142—144 is provided with an accumulator at 154 and an orifice or restriction at 156, and additionally the branch 146 is restricted as shown. The purpose here is to aid in dampening shocks incident to release and engagement of the associated brake and clutch and to aid in control of timing of various clutching elements with respect to each other, and need not necessarily take the individual arrangements here shown. A similar accumulator 158 is associated with the rear clutch motor line 150, which also includes a restriction at 160, in addition to which the branch 152 is restricted as illustrated. As will be clear, the lines to the motors HM, LM, and RM are similarly restricted but do not have accumulators such as at 154 and 158.

The operation may best be understood, to the extent described, by considering only the shift valves C and D relative to their control of the speed section motors FBM, FCM, RBM and RCM.

The front shift valve C comprises a housing 162 in which a valve spool 164 is axially shiftable between open and closed positions, the closed position being shown in Fig. 3, in which position the spool cuts off communication between the line portions 142 and 144 by separating a pair of housing ports C1 and C2. The spool blocks the port C1 but cross-connects the port C2 to a reservoir port C3. Since the shift valve C is closed, no fluid under pressure is directed to the front clutch motor FCM or to the large area side 128 of FBM.

The rear shift valve D comprises a housing 166 in which a valve spool 168 is axially shiftable to control inlet and outlet ports D1 and D2 and a reservoir port D3. The line 148 from the pump is connected to the inlet D1 and the line 150 to the rear clutch motor RCM is connected to the outlet D2. The valve is shown in its open position in Fig. 3, which illustrates that the ports D1 and D2 are in communication, thus effectuating the pressure line 148—150 to the motors RCM and RBM (the large-area side 132 of the latter). Each shift valve C or D is releasably retained in either its open or closed position by detent means, that illustrated being typical and requiring no elaboration. For the present, the means whereby the shift valves are shifted between their open and closed positions will be ignored. The shift valve C is alternated between its open and closed positions in first through fourth speeds while the rear shift valve D remains open, and the front shift valve C is alternated between its closed and opened positions in fifth through eighth speeds while the rear shift valve D remains in its closed position. These characteristics, plus the effect thereof on the intermediate or 4—5, valve E will be described later.

In the consideration of the parts played by the shift valves C and D in the control of the speed section, and looking at Fig. 3, it should be noted that although the brake motors FBM and RBM are pressurized at their small-area sides to respectively engage the front and rear brakes FB and RB, it should be remembered that the range section is in neutral and consequently no drive is transmitted to the speed section. Assuming for the moment that some form of drive is established to the speed section input 80, with the shift valves retaining their respective positions as shown in Fig. 3, the situation is now as illustrated in Fig. 4, since driving the input will establish the lowest speed in the speed section, the front brake FB and the rear clutch RC being engaged. The front clutch FC and the rear brake RB are disengaged, the former resulting from the cut-off in the line 142—144 by the closed shift valve C and the latter occurring because the large-area side 132 of the rear brake motor RBM is pressurized simultaneously with pressurizing of the rear clutch motor RCM. Hence, even though the rear brake motor RBM is pressurized for engagement of the rear brake RB, engagement is opposed or overcome by the pressurizing of the large-area side 132. Consequently, the pressurizing of the motor RBM via the line 150 dominates the pressurizing of the motor by the line 136, and the speed section is operated with the front unit I in underdrive and the rear unit II in direct drive. If the low range band is engaged, first speed forward is produced. If the high range band is engaged, the result is second speed forward. Engagement of the reverse band produces first speed in reverse. It will be noted that the positions of the shift valves C and D remain the same in neutral, first speed forward, second speed forward and first speed in reverse. These three results (first and second speed forward and first speed in reverse) utilize the lowest basic speed ratio produced in the rear section of the transmission.

The front shift valve C closes or shifts downwardly in third speed forward (Fig. 6) to provide the second of the basic speed ratios. The rear shift valve D remains open so that the rear clutch remains engaged and the rear brake disengaged. When the shift valve C opens, it connects the line portions 142—144 to establish fluid pressure to the front clutch motor and simultaneously to the large-area side 128 of the front brake motor FBM, which dominates the pressure in the line 136 as against the small-area side 130 of the front brake motor FBM, thus disengaging the front brake FB while engaging the front clutch FC. The speed section of the transmission thus operates with the first unit in direct drive and the rear or second unit in direct drive, thus establishing the second of the four paired combinations available from the front and rear units. In brief, these combinations are, in sequence in ascending order as follows: front brake—rear clutch, front clutch—rear clutch, front brake—rear brake and front clutch—rear brake. These produce the four basic speed ratios which, as previously stated, may be doubled by the use of the high and low range elements and which may be produced in reverse by use of the reverse element.

The third of the basic speed ratios (for producing fifth and sixth speeds forward) is obtained by closing the rear shift valve D at fifth speed forward (Fig. 8). This position of the rear shift valve, together with the closed position of the front shift valve C, results in removing pressure from the large-area sides of the front and rear brake motors FBM and RBM so that the small-area sides thereof are effective to engage the front and rear brakes FB and RB, thus enabling the speed section to operate with the front unit in underdrive and the rear unit in overdrive. Fifth and sixth speeds are produced from this third basic speed ratio by use of the high and low elements in the range section.

The fourth of the basic speed ratios is produced by retaining the closed position of the rear shift valve D and shifting the front shift valve C to its open position, thus retaining engagement of the rear brake RB so that the rear unit II operates in overdrive while the open position of the front shift valve C incurs pressurizing of the front clutch motor FCM in parallel with the large-area side of the front brake motor FBM, thus effecting engagement of the front clutch and disengagement of the front brake, whereby the speed section operates in direct drive in the front unit and overdrive in the rear unit. Seventh and eighth speeds are obtained from the fourth basic speed ratio by utilization of the low and high range elements.

It is one feature of the invention to provide fluid-pressurizable means for actuating the shift valves C and D, and to this end the front shift valve housing 162 is provided at opposite ends of the spool 164 with fluid-pressure-receivable chambers C4 and C5 respectively. Similar chambers D4 and D5 are provided respectively at opposite ends of the rear shift valve housing 166. The ends of the respective spool valves 164 and 168 afford pistons and the chambers just described afford cylinders. In the interests of brevity and clarity, the cylinder-piston assemblies just described will be referred to simply as fluid-pressurizable operators C4, C5, D4 and D5.

The pressurizable operators just referred to are activated by a main control valve V, the details of which (Figs. 16 through 20) may be ignored for the moment. Suffice it to note that the valve has a first line 170 leading ultimately at 172 to the operator C4 and at 174 to the intermediate or 4—5 valve E, which valve has a housing 176 containing an axially shiftable spool valve 178 normally biased at 180 to a closed or inactive position (Figs. 3-6 and 9-15). The valve housing 176 has a port E1 to which the line 174 is connected and from which the inactively positioned valve spool 178 separates a second port E2. A line 182 runs from the port E2 to the operator D4 for the rear shift valve D. Thus, and assuming that the lines 184 and 182 are interconnected at E1 and E2, it will be seen that the operators C4 and D4 are connected in parallel to the valve line 170, and that the intermediate or 4—5 valve E is effective to control the connection or disconnection of the line portions 174—182.

A similar parallel connection is effected between the operators C5 and D5 and this connection goes also through the 4—5 valve E. For this purpose, the valve V has a second outlet line 184 which leads via a line 186 to the operator C5 and which further leads via a line 188 to a port E3 in the valve housing 176. The valve spool 178 of the valve E, when in its inactive position to which it is biased, separates the port E3 from a companion port E4 but connects the two ports E2 and E4 to a reservoir port E5. A fluid line 190 connects the port E4 of the valve E to the operator D5 of the rear shift valve D.

In addition to the four operators already described (C4, C5, D4 and D5), a fifth operator E6 is provided for selectively opening the 4—5 valve E against the bias of its spring 180. This operator E6 is pressurized from the main control valve V via a line 192. These elements constitute means for selectively opening the intermediate or 4—5 valve, and the biasing means 180 constitutes means for closing that valve. The operator E6 comprises, of course, a chamber within which the proximate end of the spool valve 178 serves as a piston.

Again ignoring the effectiveness of the range section, except as means to furnish input to the speed section, it will be seen that the 4—5 valve is instrumental in closing the rear shift valve D in the upshift from fourth to fifth and for opening the rear shift valve in the downshift from fifth to fourth. This will be best understood by considering that the 4—5 valve E is closed in neutral through third positions (Figs. 3 through 6), during which time of course the open position of the rear shift valve D is retained while the front shift valve C is alternated between its opened and closed positions. That is to say, when the main control valve V is set in a position to pressurize the line 170, fluid under pressure is supplied via the line 172 to the opening operator C4 for the front shift valve C, moving this shift valve to its open position as shown in Fig. 6 (third speed forward). Although the line 174 is also pressurized, it is cut off from the line 182 at the port E2 because of the valve spool in the 4—5 valve E. Likewise, in shifting down from third to second, the valve V is set to pressurize the line 184 which via the line 186 pressurizes the closing operator C5 of the front shift valve C, moving this valve to its closed position as shown in Fig. 5 (second speed forward). At the same time, the line 188 is pressurized but it is cut off at the port E3 in the 4—5 valve E. Consequently, the front shift valve may be alternated between its open and closed positions while the rear shift valve maintains its open position. Thus, in first through fourth speeds the rear clutch remains engaged (Fig. 2; Figs. 3 through 7), and the front brake and front clutch are alternately engaged (same figures).

At the upshift from fourth to fifth, the 4—5 valve operator E6 is pressurized via the line 192 by setting of the valve V in the selected position, whereupon the valve E is moved to its active or open position, interconnecting the ports E1 and E2 and interconnecting the ports E3 and E4 (Fig. 7). The lines 170, 172 and 174 are simultaneously pressurized to pressurize the opening operators C4 and D4, but this is merely a conditioning phase, since the operator C4 has been pressurized in third speed forward to open the front shift valve C and the rear shift valve D has always been in its open position. That is to say, this is a conditioning phase in the upshift, but it is an effective phase in the downshift from fifth to fourth, as will presently be seen. Now, in the upshift from fourth to fifth, the line 192 remains pressurized to activate the opening chamber E6 for the 4—5 valve E and at the same time the line 184 is pressurized which in turn pressurizes the lines 186 and 188. The line 186 activates the closing operator C5 and the actively positioned 4—5 valve E interconnects the ports E3 and E4 to energize the line 190 so that the rear shift valve closing operator D5 is pressurized, thereby closing the rear shift valve and cutting out the line 150 to the rear clutch motor RCM and rear clutch motor branch 152, whereby the rear brake motor alone is effectuated in the rear unit II (Fig. 8; fifth speed forward). Since the closing operator C5 for the front shift valve C also closes that valve, the front clutch motor FCM is cut out and only the front clutch brake motor FBM is effective. Consequently, the speed section is operating with both brakes engaged and consequently produces underdrive in the front unit I and overdrive in the rear unit II. It is at this point that the greatest number of engageable devices is involved, which will be clear from the fact that in first through fourth the rear clutch remains engaged while the change is made alternately between the front brake and the front clutch. But between fourth and fifth, the front and rear clutches must be disengaged and both front and rear brakes must be engaged. Once this is accomplished, the rear brake remains engaged in speeds from fifth through eighth, while only the front and rear clutch and brake are alternated (Fig. 2).

In the downshift from fifth to fourth, the 4—5 valve operator E6 is pressurized via the line 192 and the actively positioned or open 4—5 valve thus connects the ports E1 and E2 so as to pressurize the opening operator D4 for the rear shift valve D, thus moving the rear shift valve from its closed position of Fig. 8 to its open position of Figs. 7 through 3, thus reestablishing the range in which only the rear clutch is engaged.

In considering operation of the speed section in reverse, only four speeds are produced, of course. In first and second speeds in reverse, the rear clutch is engaged and the front clutch and front brake are alternated. In third and fourth speeds in reverse, the rear brake remains engaged and the front brake and front clutch are alternated. This is comparable to considering the speed ratios produced, for example, in first, third, fifth and seventh forward, since the additional or intervening speeds are produced, as will be described below, by alternating the range section between low and high. The high and low elements are not of course, used in reverse, but the reverse brake is engaged throughout the four reverse speeds (Fig. 2). In the reverse phase, the 4—5 valve becomes effective between second and third on the upshift and between third and second on the downshift.

The pump line 138 is extended at 194 and leads to the direction valve A, which valve has a housing 196 in which the spool 140 is mounted. This housing has an inlet port A1 to which the line 194 is connected and in addition has an outlet A2 leading via a line 198 to the forward valve B. A second or reverse motor outlet A3 is connected by a line 200 to the reverse motor RM. The housing also includes an exhaust port A4. When the direction valve A is in its neutral position (Fig. 3) the inlet A1 is separated from the outlets A2 and A3 and the outlet A3 is connected to the reservoir port A4. The valve spool 140 is shown as having a groove at one end by means of which any conventional shifter fork may be used to shift it and the lines opposite the respective letters R, N and F indicate registration with this groove. For example, in Fig. 3, the line from the letter N is registered with the shifter groove. These details are unimportant structurally but are referred to only as a matter of convenience in following the description.

The schematic illustration resorted to here does not show in its entirety the complete housing structure in which the mechanism and controls are mounted, but that is immaterial to the present disclosure. Suffice it to note that a housing portion shown at 202 has a chamber 204 from which a line 206 is extended to the valve B, which valve has a housing 208 provided with a first inlet port B1 to which the line 206 is connected. The chamber 204 is selectively supplied with fluid from the previously described valve lines 170 or 184, the former having a supply branch 210 and the latter having a supply branch 212. Fluid supply to the chamber 204 from the lines 210 and 212 and back to those lines is controlled by a pair of check valves G and K, here shown schematically as being of the flapper type; although, any other suitable type could be used.

The valve housing 208 for the valve B has a low motor outlet B2 which is connected by a line 214 to the small-area side 126 of the low motor LM. The main control valve V, via a line 216, supplies a second inlet B3 in the valve B and this inlet is paired with a second outlet B4 which leads via a line 218 to the high motor HM. A branch 220 connects the line 218 in parallel with the large-area side 124 of the low motor. The valve B includes a valve spool 222 normally biased to a closed position as shown in Fig. 3 by biasing means such as a spring 224. In this condition of the valve, the ports B2 and B4 from the motors LM and HM are connected to the reservoir via a reservoir port B5. Active positioning of the valve B is accomplished by the line 198 and an operator B6 which, like the previously described operators, comprises a chamber in which the proximate end of the valve spool 222 serves as a piston.

The main control valve V has a pressure-receiving inlet line 226 and has the plurality of distributing lines 170, 184, 192 and 216, all of which have been described somewhat generally. However, this general description will suffice for a brief understanding of the operation of the range motors HM, LM and RM. At this point, it should be noted that the speed section is under control of the shift valves C and D and the 4—5 valve E, and that the range section is under control of the direction valve A and the forward valve B. The main valve V co-ordinates the four hydraulic valves B, C, D and E and is manually controlled. The direction valve A is manually controlled. The valve V may be considered a selector, since it is capable of operating the transmission through its eight speeds forward with the direction valve in its F position and four speeds in reverse with the direction valve in its R position.

When the direction valve is in its N position (Fig. 3) none of the range section motors is pressurized. The forward valve B is biased to its inactive or closed position by the spring 224. When the direction valve A is shifted to its F position (Fig. 4) the lines 194 and 198 are connected at ports A1 and A2 by downward movement of the spool valve 140, thus pressurizing the operator B6 for the forward valve B, whereupon this valve is shifted upwardly against the bias of its spring so as to register ports B1 and B2. Although ports B3 and B4 are also registered or connected, they have no function in first speed forward. As described above, the speed section is controlled by the valves C, D and E, but for the moment these will be ignored and only range selection control will be considered.

With the valve B shifted to its active position (Fig. 4) the main control valve is operated to pressurize the line 184 which through the branch 212 opens the check valve G to pressurize the line 206. This conducts fluid under pressure through the connected ports B1 and B2 to the line 214 which leads to the small-area side of the low motor LM, thus engaging the low band 66 to produce low in the range section.

For the purpose of producing the eight forward speeds, the position of valve A at F is retained, which keeps the pressure on the operator B6 for valve B, thus always keeping valve B up or open during forward operation of the transmission. As previously described, an incident to the open position of valve B is the interconnection of the ports B4 and B3. Now, if the main valve V is operated to pressurize the line 216, connection is made from this line via the ports B3 and B4 to the line 218 and thus to the high motor HM. The branch from the line 218 pressurizes the large-area side 124 of the low motor LM, thus dominating this motor and releasing the band 66 on the low element simultaneously with engagement of the band 60 on the high element, thus producing high range in the range section. This enables alternation between high and low to double the speeds of the range section. It should also be noted that the line 206 to the port B1 of the valve B is capable of being pressurized also by the line 170 from the main control valve, since the line 206 is connected to the chamber 204 which is connected to both lines 170 and 184 via the branches 210 and 212 respectively. The line 170 is primarily a line for incurring the open positions of the shift valves C and D, while the line 184 is primarily a line for incurring the closed positions of these two shift valves. Hence, as the shift valve C is alternated between opened and closed positions, the result is simultaneous pressurizing of the line 206 which leads ultimately to the low motor LM, as the main valve selectively pressurizes lines 170 or 184. At the transition between fourth and fifth or fifth and fourth, the intermediate or 4—5 valve E brings in the rear shift valve D and, since this rear shift valve is pressurized by the same lines 170 and 184, the alternate selection of lines 206 and 216 is still effective.

When the direction valve A is shifted to its R position to secure reverse in the range section (Fig. 12) the pressurized port A1 is now connected to port A3 which in turn feeds line 200 to the reverse motor RM. When port A1 is connected to port A3, it is simultaneously disconnected from port A2, thus relieving pressure on operator B6 of the forward valve, whereupon the forward valve returns to its inactive or closed position, disconnecting port B1 from port B2 and port B3 from port B4. Hence, pressure line 194 now feeds the reverse motor exclusively of the others, tightening reverse band 78 while the high and low bands 60 and 66 are disengaged. The four forward speeds are secured in reverse by retaining the R position of the direction valve and the main valve V is used to control the speed section via the shift valves C and D and the 4—5 valve E. When direction valve A is in its R position (Fig. 12) the chamber or operator B6 of the forward valve B exhausts to reservoir via the line 198, port A2 and the open bottom of the direction valve housing.

The details of the main control valve B are shown in Figs. 16 through 20, wherein it is clear that this valve comprises a housing 228 and a rotary valve barrel 230 having an axial bore 232 connected permanently to reservoir. The high pressure line 226 is connected to the valve inlet at 234, and the lines 170, 184, 216 and 192 are connected to distributing outlets as shown in Figs. 17, 19 and 20. Specifically, the line 184 is used in first, second, fifth and sixth speeds forward and first and third speeds reverse and therefore has two parallel connections 184' and 184" to valve passages or distributing outlets 184A and 184B (Fig. 17). The line 170 likewise has parallel branch connections 170' and 170" to valve passages or outlets 170A and 170B, since this line is used in third and fourth and in seventh and eighth speeds forward (Fig. 17) and 2nd and 4th speeds reverse. The line 216 is used in combination with lines 170 and 184. For example, in second and sixth speeds forward, the line 216 is used with the line 184, and is used with the line 170 in fourth and eighth speeds forward. Hence, the line 216 has two parallel branches 216' and 216" connected to valve passages or outlets 216A and 216B (Fig. 19). The line 192, which is used at times in conjunction with line 170 and at times in conjunction with line 184, is connected to a valve passage or chamber 192' (Fig. 20) which has a pair of parallel branches or outlets 192A and 192B. As will be seen, the use of line 192 occurs in fourth and fifth speeds forward and in second and third speeds in reverse. The general planes in which the lines just described are located are shown schematically in Fig. 16 and are identified by the respective line numbers.

In Figs. 3 through 15, the lines of the system that are pressurized in the respective speed conditions are stippled to distinguish them from the lines carrying only reservoir pressure.

The valve barrel 230 has an annular high pressure groove 236 and a semi-annular reservoir or return groove 238, the latter communicating with the axial return bore 232 via a radial passage 240. Other radial return passages are provided in the barrel at 242 (Figs. 16 and 17), and at 244 and 246 (Figs. 16 and 19). Longitudinal pressure grooves 248 and 250 extend respectively in opposite directions from the annular pressure groove 236 at the O.D. of the valve barrel, and a single pressure groove 252 runs longitudinally from the annular pressure groove at the diametrically opposed O.D. portion of the barrel.

The valve barrel 230 may be rotated in any suitable manner, such as by providing a pinion (not shown) on the end of a coaxial shaft such as suggested in Fig. 16 at 254. As regards the forward speeds, the successive speed positions are obtained by rotating the valve successively in angular increments of 45° in a counterclockwise direction. Reverse speeds are obtained by rotating the valve in the same direction but through increments of 90°. In other words, in the reverse phase, every other forward position is skipped. This will be clear from the suggested shift pattern in Fig. 21. In other words, first, second, third and fourth speeds in reverse correspond respectively to first, third, fifth, and seventh speeds forward. Any appropriate valve-operating mechanism may be provided.

The positions of the valve are shown in the respective sections in Figs. 17, 18, 19 and 20, by numerals 1 through 8, the valve in those positions being in first speed (either forward or reverse), and for purposes of comprehending the structure and operation, the index at "1" will be 248 in Fig. 17, 250 in Fig. 18, 250 in Fig. 19 and 240 in Fig. 20. When the valve is turned counterclockwise to produce second speed, the "indices" just mentioned will register respectively with the "2" position, etc.

Operation

It should be observed at the outset that the transmission and the control thereof follows a certain pattern. For example, and referring primarily to Fig. 2, it will be noted that in speeds one through four forward, the rear clutch RC is always engaged and in speeds five through eight forward the rear brake RB is always engaged. In speeds one and two, the front brake is always engaged and the two speeds are produced by alternating between low and high in the range section. In speeds three and four, the front clutch is engaged and third and fourth speeds are provided again by alternating between low and high in the range section. Speeds five and six are a repeat of speeds one and two, except that the rear brake instead of the rear clutch is engaged. Speeds seven and eight are a repeat of speeds three and four except that the rear brake is engaged rather than the rear clutch. In all eight speeds, the multiplication or doubling of forward speeds is obtained by alternating between low and high in the range section.

In obtaining the four speeds in reverse, the rear clutch remains engaged in first and second and the difference between the two speeds is produced by alternating between the front brake and the front clutch in the front section I. In third and fourth in reverse, the rear brake is engaged and again the difference between the two speeds is obtained by alternating between the front brake and front clutch in section I. In all reverse speeds of course the reverse brake is engaged.

A definite pattern is established in the hydraulic control system. It must be initially recognized that certain of the lines will be pressurized directly from the variable displacement pump, in which connection it should be noted that pumps of other types could be used. For example, in a commercial embodiment, a second pump would be provided so that it would be driven by the vehicle wheels, whereby the vehicle could be started by pushing. However, the combination of pumps is generally conventional and therefore is not illustrated. The lines always pressurized from the pump, irrespective of the position of the main control valve V, are lines 136, 148, 138, 142, 194 and 226, in addition to which the small-area sides of the front and rear brake motors FBM and RBM are always pressurized. When the direction valve A is in its F position, the line 198 is pressurized, and it remains only to use the main control valve V to select low or high and also to operate one or the other of the shift valves C or D, in conjunction with which the 4—5 valve E is operated at fourth and fifth speeds forward and between second and third speeds in reverse.

For example, first speed forward is produced by using the main control valve to pressurize line 184 which through branch 212, check valve G, line 206, ports B1 and B2 in forward valve B and pressure line 214 pressurizes the lower motor LM and engages the low motor band 66. Since the shift from low to high is made by engaging the high band 60 and at the same time releasing the low band 66, it remains only to retain pressurization in line 184 and to superimpose on the system pressurizing of line 216. Hence, the difference between first and second speeds is the addition of pressure to line 216, line 184 being pressurized in both positions.

In third and fourth, the difference is that in third line 170 is pressurized and in fourth pressurizing is added to line 216, in addition to which line 192 is pressurized to operator E6 of the 4—5 valve E, whereby this valve is opened to condition shift valve D for functioning. Fifth is substantially a repeat of first, except that line 192 is retained with line 184. Sixth is a repeat of second. Or, stated otherwise, sixth, like second, adds 216 to 184, but withdraws 192. Seventh is a repeat of third, using line 170 alone. Eighth is a repeat of fourth, but withdrawing 192 and adding 216. In other words, considering first, third, fifth and seventh as the basic speeds, the next higher speed in each case is used by pressurizing line 216 which causes high motor HM to dominate low motor LM.

*First speed forward*

The transmission when in neutral incurs the valve positions of Fig. 3. Specifically, the direction valve is in its "N" position, valve B is closed, the front shift valve C is closed, the rear shift valve D is open, and the 4—5 valve is closed. The main control valve is in its first speed position as shown in Figs. 17 through 20. When direction valve A is moved down to its "F" position, it interconnects ports A1 and A2 and pressurizes line 198 and forward valve chamber B6 to open forward valve B, whereupon the ports B1 and B2 are connected. Since valve V is in its first speed position, line 184 is pressurized, opening check valve G at branch 212 and supplying fluid under pressure through line 206, ports B1 and B2 and low motor pressure line 214 to the small-area side 126 of low motor LM. High pressure from the valve V is supplied through line 184 as will be clear from Figs. 17 through 20. High pressure at 226 is supplied to groove 236 and thence to longitudinal grooves 248, 250 and 252. As shown in Fig. 19, grooves 250 and 252 are blocked, but as shown in Fig. 17 groove 248 communicates with branch 184B. Hence, fluid under-pressure flows from branch 184B through 184" to 184. Lines 170, 216 and 192 are connected to reservoir. The connection as to line 170 is via 170", branch 170B and valve barrel passage 242 to valve barrel axial bore 232 (Fig. 17). Line 216 is connected to reservoir via 216', 216A, valve barrel passage 244 and 246 to valve passage axial bore 232 (Fig. 19), from which it will be seen that valve passage 216A communicates with both 244 and 246. Line 192 returns to reservoir (Fig. 20) via 192', 192A and 192B to reservoir groove 238 and hence through radial passage 240 to axial bore 232.

When line 184 is pressurized, its branch 188 runs to port E3 of 4—5 valve E, but the valve spool is closed and blocks port E3 so that there is no communication between ports E3 and E4. Hence, the position of rear shift valve D is not affected. Branch 186 which leads from line 188 runs to port C1 of front shift valve C but this shift valve is closed and there is no communication between ports C1 and C2. Hence, line 144 is not pressurized and therefore front brake motor FBM is energized to tighten band 112 on front brake FB. In the case of shift valve D, which is open, communication is established between port D1 and D2 so that line 150 pressurizes both rear clutch motor RCM and the large-area side 132 of rear brake motor RBM, thus engaging the rear clutch RC and disengaging the rear brake RB. As shown in Fig. 2, first speed thus is established by engagement of low band 66, front brake FB and rear clutch RC.

*Second speed forward*

The basic requirement for this speed is to superimpose actuation of high motor HM on the situation as it exists for first speed. This is accomplished by retaining pressurizing of line 184 and adding thereto pressurizing of line 216. Direction valve A remains in its forward position and forward valve B remains open, since it is pressurized at 198—B6. Main valve V is rotated 45° counterclockwise and it will be apparent from Fig. 18 that pressure groove 236 is in constant communication with high pressure line 226. Fig. 17 will show that when groove 248 moves from position No. 1 to position No. 2 it remains in communication with valve passage 184B. Hence, communication between the high pressure line and the outlet 184 is retained. From Fig. 19 it will be seen that as groove 250 moves to No. 2 position it remains blocked. However, passage 252 moves to the position formerly occupied by reservoir radial passage 246. In other words, it moves from position No. 5 to position No. 6 and thereby is in communication with valve housing passage 216A. This passage leads to branch 216' and hence to line 216 for ultimate communication with high motor HM via forward valve ports B3 and B4 and high motor line 218. Fluid flows in parallel through branch 220 to the large-area side 124 of the low motor LM, thus disengaging this motor simultaneously with tightening of the high band 60. No change is effected in shift valves C or D or 4—5 valve E. In both first and second speeds forward, no change is made in the speed section of the transmission.

*Third speed forward*

It is in this speed that the first change is made in the speed section, and this change involves release of the front brake band 112 and engagement of the front clutch FC. The range section change involves a return to application of the low band 66. Hence, what is required is pressurizing of line 170 rather than 184, and this is achieved by rotating valve barrel in main valve V one more increment in a counterclockwise direction, bringing groove 248 to the No. 3 position as shown in Fig. 17, thus communicating high pressure with branch 170' and thence to line 170. As seen in Fig. 19, as groove 250 moves to the No. 3 position, it remains blocked. Groove 252 will move from the No. 5 to the No. 7 position in Fig. 19 and will be blocked. Hence, this will cut out line 216. Lines 184, 192 and 216 are connected to the reservoir. Line 118 returns to reservoir at 184", 184B, 242 and 232. Line 216 finds its return at 216", 216B, 246 and 232. Line 192 returns via 192', 238, 240 and 232. When line 170 is pressurized, fluid under pressure is still supplied to the line 206 which leads through the connection ports B1 and B2 and forward valve B to low motor LM for engaging low band 66. At the same time, branches 174 and 172 are pressurized. Branch 174 is cut off at port E1 by closed valve E, but branch 172 leads to operator C4 of front shift valve C, thus forcing this valve down (Fig. 6) and opening the valve so that constantly pressurized line 142 communicates via ports C1 and C2 to line 144 and thence to front clutch motor FCM, engaging this clutch and directing fluid under pressure through branch 146 to the large-area side 128 of the front brake motor FBM, thus disengaging the front brake so that the transmission elements engaged are low band 66, front clutch FC and rear clutch RC. Since valve E remains closed, there is no change in rear shift valve D.

*Fourth speed forward*

As previously described, second speed results from the use of the first speed situation plus the addition of line 216. The same is true as between third and fourth speeds and fourth speed adds line 216 to the situation as developed in third speed forward. The change in main valve V involves rotating the valve barrel until groove 248 lines up at the No. 4 position, wherein it will be seen that it still remains in communication with valve passage 170A because of the angular dimension of that passage. Hence, high pressure is still directed to line 170 but this time via branch 170'. As passage 250 moves to the No. 4 position (Fig. 19) it registers with valve passage 216A and fluid under pressure is thus directed at 216' to line 216 and thence through forward valve B to high motor HM, branch 220 again being instrumental in dominating low motor LM so that high band 60 is engaged and low band 66 is disengaged. No change is made in the speed section of the transmission, with the exception that valve E is conditioned for subsequently effecting the upshift from fourth to fifth. This occurs because line 192 is pressurized to supply fluid to 4—5 valve operator E6, which will be clear from Fig. 20, wherein it will be seen that valve barrel groove 252 in moving three increments from the No. 5 position as shown to the No. 8 position will register with branch 192B and hence will supply fluid under-pressure through line 192. This will open 4—5 valve E and will interconnect ports E1 and E2 and ports E3 and E4. At this time, branch 174 from line 170 will communicate at connected ports E1 and E2 to supply line 182 to the operator D4 of rear shift valve D. At the moment, this pressurizing of operator D4 has no effect, because shift valve D is already down or open. Although ports E3 and E4 are connected, there is no functional effect, since line 188 as a branch of line 184 is connected to reservoir. Although, as already indicated, shift valve D is already opened and is thus not affected by pressurizing of operator D4 on the upshift from fourth to fifth, this phase is instrumental in the downshift from fifth to fourth, as will be brought out below.

*Fifth speed forward*

Up to this point, with the transmission operating in first through fourth speeds forward, the rear clutch is always engaged and the change from first to second to third to fourth is effected by alternating between the front brake and front clutch and the low and high elements L and H. However, in the transition from fourth to fifth, the speed section is changed so that the rear brake is effective instead of the rear clutch. At the same time, the front section must change from front clutch to front brake and also, in the range section, the change must be made from high band to low band 66. It is in this phase that 4—5 valve E becomes important.

As before, valve A is in the F position, valve B is open and the pump lines are pressurized as before, to pressurize front brake motor FBM and rear motor RBM. As in first speed forward, line 184 must be pressurized from main control valve V. Also, line 192 to operator E6 for 4—5 valve E must be pressurized. Lines 170 and 216 must be connected to reservoir. This occurs as valve barrel 230 is moved from its No. 1 position to its No. 5 position as seen in Fig. 17, wherein groove 248, in register with valve passage 170A in fourth speed, is now brought into register with valve passage 184A. This supplies line 184 via branch 184'. As seen in Fig. 19, as groove 250 moves from the No. 1 position to the No. 5 position, it is blocked. Or, as groove 250 moves from No. 4 position in communication with valve passage 216A, it is cut off from that passage as it is blocked. Since groove 252 is diametrically opposite groove 250, it occupies the No. 1 position in Fig. 19 and it is blocked but is open to valve branch 192A in Fig. 20, thus supplying fluid under-pressure to 4—5 valve line 192. When this condition obtains, line 184 supplies low motor LM through forward valve B (ports B1 and B2) and line 214. Line 186 supplies front shift valve operator C5, thus shifting this valve up or to its closed position. Branch 188 supplies port E3 of 4—5 valve E and since this port is connected to port E4, line 190 is pressurized to pressurize operator D5 of rear shift valve D, thus shifting this valve up or closing it. With both shift valves C and D closed, fluid under-pressure is cut off to the front and rear clutch motors FCM and RCM and thus the front and rear brake motors FBM and RBM are effective to engage front and rear brake bands 112 and 114 (Fig. 8).

*Sixth speed forward*

This is substantially a duplicate of second speed, and hence requires pressurizing of lines 184 and 216. In other words, it follows fifth speed but adds thereto pressurizing of line 216 so that high motor HM may dominate low motor LM and thus make the change in the range section. Another incident in this speed is that line 192 is cut off. This occurs as follows, having reference to the valve positions as shown in Figs. 17 through 20: As valve 248 moves from its No. 5 to its No. 6 position (Fig. 17) it retains register with passage 184A, because of the angular dimension of that passage. In Fig. 19, as groove 250 moves to its No. 6 position it registers with valve passage 216A, thus supplying fluid under pressure to the line 216 via branch 216'. Passage 252 is blocked, being diametrically opposite groove 250. In Fig. 20, groove 252, which was in register with valve passage 192A in fifth speed, now moves 45° in a counterclockwise direction to cut off communication to passage 192A, thus cutting out line 192 and allowing 4—5 valve E to close. Shift valve D, moving upwardly or to its closed position, is retained thereat by the detent mechanism previously described. The same is true of shift valve C. Hence, the shift valves remain as they were in fifth speed and again the additional or intervening speed (here sixth) is added to fifth by causing the high motor HM to dominate the low motor LM, thus effecting the change from low to high in the range section of the transmission.

*Seventh speed forward*

This involves the same conditions as in third speed forward, namely pressurizing of line 170 alone by main control valve B. This will be clear from Fig. 17 wherein it will be seen that as groove 248 moves to No. 7 position it registers with valve passage 170B and supplies fluid under-pressure to line 170 via branch 170". Grooves 250 and 252 are blocked, which will be clear from Fig. 19. Return valve barrel groove 240 registers via return groove 238 with valve passage 192' to connect 192 to reservoir. Return radial passage 246 registers with valve passage 216A, since in seventh speed forward, passage 246 will occupy the position occupied by passage 244 in first speed forward.

*Eighth speed forward*

The production of this speed involves substantially a duplication of fourth speed forward, except that line 192 is not pressurized. Stated otherwise, it adds pressurizing of line 216 to the condition obtaining in the production of seventh speed forward. This will be clear from Fig. 19 wherein it will be seen that groove 250, when it moves to No. 8 position, is in register with valve passage 216B, thus supplying line 216 via 216'. The continuation of high pressure supply to line 170 results because of the angular width of valve passage 170B, enabling valve barrel groove 248, in register with this passage in the No. 7 position, to remain in register in the No. 8 position. Line 192 is cut out because passage 252, being out of communication with valve passage 192', is still further out of communication with that passage upon one more counterclockwise increment of movement of the valve barrel.

*Downshift from fifth to fourth*

As will be clear from Fig. 8, the situation that obtains here is that both shift valves C and D are closed or in their up positions, shift valve C having been moved to that position by pressurizing the line 186 and operator C5 and shift valve D attaining its position by opening of 4—5 valve E and pressurizing operator D5 via lines 190. In the downshift, the change is made from line 184 and 192 to lines 170 and 192. This again involves a multiple engagement and disengagement of several components. Namely, the shift must occur from low band 66 in fifth speed forward to high band 60 in fourth speed. Front and rear brakes FB and RB must be disengaged and front and rear clutches FC and RC must be engaged. When line 170 is pressurized, fluid under pressure flows through branch 174 and through connected ports E1 and E2, since 4—5 valve E is opened by line 192 and operator E6. This enables the supply of fluid under pressure via line 182 to the operator D4 of rear shift valve D, thus shifting this valve down from its Fig. 8 position to its open position of Fig. 7, thereby connecting, via ports D1 and D2, line 150 to rear clutch motor RCM, thus dominating rear brake motor RBM and applying rear clutch RC and disengaging rear brake band 114. Branch 172 of pressurized line 170 supplies operator C4 and opens front shift valve C so that, via ports C1 and C2, front clutch line 144 is supplied, engaging front clutch and dominating front brake motor FBM.

*Reverse speeds*

The situations involved are shown in Figs. 12, 13, 14 and 15 and are charted in Fig. 2, from which it will be clear that the direction valve A is moved to its "R" position. As this occurs, forward valve B closes and lines 206 and 216 are no longer instrumental in control of the range section. Actually, once the shift in direction valve A is made from N to R, ports A1 and A3 are connected to pressurize line 200 and thus to activate reverse motor RM to tighten reverse band 78. This band remains engaged throughout all reverse speeds. Of course, line 206 will be supplied from valve V as the valve interchanges lines 170 and 184, but since forward valve B is closed, this line is deadended at closed port B1. Therefore, the reverse speeds are accomplished, once reverse band 78 is engaged, primarily through operation of the shift valves C and D and 4—5 valve E.

As previously indicated, first, second, third and fourth speeds in reverse correspond respectively to first, third, fifth and seventh speeds forward. Hence, what is needed from main valve V for first speed in reverse is pressurizing of line 184 to insure closing of front shift valve C. Since valve E is closed, pressurizing of line 188 is of no effect. Second speed in reverse is achieved by changing from line 184 to line 170, pressurizing line 172 to pressurize front shift valve operator C4 for opening front shift valve C (Fig. 13). Hence, the change is made in the speed section from engagement of front brake band 112 to engagement of front clutch FC. The rear clutch remains engaged in both first and second speeds in reverse (see Fig. 2).

Third speed in reverse is obtained by switching back to line 184 and adding line 192, again pressurizing front shift valve operator C5 via line 186 and at the same time opening valve E. The first-mentioned condition closes front shift valve C and cuts out pressure to the front clutch motor FCM, thereby allowing front brake motor FB to engage. As valve E opens, it interconnects ports E3 and E4 and line 188 pressurizes rear shift valve operator D5 via line 190, thus closing this shift valve and cutting out fluid pressure supply to the rear clutch motor RCM, thus effectuating rear brake motor RBM so that both speed section bands 112 and 114 are engaged.

At this point, it may be well to note that the change from second speed in reverse to third speed in reverse entails somewhat the same situation as the 4—5 upshift in the forward direction. This is accomplished as the main valve V is moved from the second speed reverse position (corresponding to third speed forward position) to third speed reverse position (corresponding to fifth speed forward position), whereupon during this change the main valve V passes through fourth speed forward position. Hence, in the interval between second and third speeds in reverse the intermediate valve E opens so that the upshift between second and third may be obtained. The same situation holds true in the downshift from third to second in reverse.

Fourth speed in reverse is similar to seventh speed forward, requiring a change from line 184 (for third speed reverse) to line 170, thus opening front shift valve C while retaining the position of rear shift valve D. As already indicated, the reverse speeds are obtained by alternating the units in the speed section without effecting any change in the range section, since there is only one range component involved and thus no requirement for alternating between low and high as in the forward speeds.

*Summary*

As will be seen, the transmission and its control, although appearing relatively complicated, is actually quite simple, following the definite patterns previously covered. Its simplicity resides largely in the fact that it has only two manual valves and the automatic or hydraulic valves B, C, D and E. The arrangement lends itself to the convenient shift pattern of Fig. 21 and is based largely on the premise that the smoothness of the transmission in shifting from one speed to another, whether up or down, is improved by minimizing the number of elements that must be engaged and disengaged. Of course, there is an exception in the transition between fourth and fifth or fifth and fourth (second and third and third and second in reverse) but this is accommodated by the 4—5 or intermediate valve E.

A particular feature of pressurizing both sides of RBM and FBM is the elimination of additional valve parts. A further advantage of the hydraulically operated shift valves is what timing of the shift function occurs from a single source.

Features of the invention other than those categorically enumerated will undoubtedly occur to those versed in the art, as will many modifications and alterations in the preferred embodiment of the invention disclosed, all of which may be achieved without departure from the spirit and scope of the invention.

What is claimed is:

1. A change-speed transmission, comprising: a speed section having first and second planetary units in series, said first unit including a clutch and a brake alternately engageable to produce respectively direct drive and underdrive and said second unit including a clutch and a brake alternately engageable to produce respectively direct drive and overdrive; speed section control means for selectively engaging combinations of both unit brakes, both unit clutches, and either unit brake and the other unit clutch to produce four speeds in one direction; a range section upstream of the speed section and including an input shaft, an output shaft driving the first speed section unit, and high, low and reverse drive elements for driving the output shaft selectively in high, low and reverse ranges to double the aforesaid four speeds in one direction and to produce said four speeds in the reverse direction; and range section control means for selectively effectuating said elements.

2. A change-speed transmission, comprising: a speed section having first and second planetary units in series, said first unit including a clutch and a brake alternately engageable to produce respectively direct drive and underdrive and said second unit including a clutch and a brake alternately engageable to produce respectively direct drive and overdrive; speed section control means for selectively engaging the first unit brake and second unit clutch, both clutches, both brakes, and the first unit clutch and second unit brake to produce four basic speed ratios in one direction and in ascending order in the order of engagement as aforesaid; a range section upstream of the speed section and including an input shaft, an output shaft driving the first speed section unit, and high, low and reverse drive elements for driving the output shaft selectively in high, low and reverse ranges; and range section control means including a reverse control portion for individually effectuating the reverse element to produce said four speed ratios in reverse and a high-low control portion for alternately effectuating the low and high elements to produce four additional speed ratios in said one direction and staggered with said four basic speed ratios.

3. A change-speed transmission, comprising: a speed section having first and second planetary units in series, said first unit including a clutch and a brake alternately engageable to produce respectively direct drive and gear drive and said second unit including a clutch and a brake alternately engageable to produce respectively direct drive and gear drive; speed section control means for selectively engaging combinations of both unit brakes, both unit clutches, and either unit brake and the other unit clutch to produce four speeds in one direction; a range section upstream of the speed section and including an input shaft, an output shaft driving the first speed section unit, and high, low and reverse drive elements for driving the output shaft selectively in high, low and reverse ranges to double the aforesaid four speeds in one direction and to produce said four speeds in the reverse direction; and range section control means for selectively effectuating said elements.

4. A change-speed transmission, comprising: a speed section having first and second planetary units in series, said first unit including a clutch and a brake alternately engageable to produce respectively direct drive and underdrive and said second unit including a clutch and a brake alternately engageable to produce respectively direct drive and overdrive, said clutches and brakes being selectively engageable in any one of four paired combinations consisting of the first unit brake and second unit clutch, both clutches, both brakes, and the first unit clutch and second unit brake to produce four basic speed ratios; a range section upstream of the speed section and including an input shaft, an output shaft driving the first speed section unit, and high, low and reverse drive elements for driving the output shaft selectively in high, low and reverse ranges; and control means operative to select any one of said paired combinations and to further selectively effectuate any one of the high, low and reverse elements while retaining engagement of the selected paired combination so as to produce two speeds forward and one speed in reverse in each combination.

5. A change-speed transmission, comprising: a speed section having first and second two-speed units in series and operative in four combinations to produce four basic speed ratios; a range section upstream of the speed section and including an input shaft, an output shaft driving the first speed section unit, and high, low and reverse drive elements for driving the output shaft selectively in high, low and reverse ranges; and control means operative to select any one of said four combinations and to further selectively effectuate any one of the high, low and reverse elements while retaining operativeness of the selected combination so as to produce two speeds forward and one speed in reverse in each combination.

6. A change-speed transmission, comprising: a speed section including drive mechanism selectively settable to produce a plurality of basic speed ratios; a range section upstream of the speed section and including an input shaft, an output shaft connected to the drive mechanism, and low and high range elements selectively engageable between the input and output shafts to double the speed ratios; a high range fluid motor for engaging and disengaging the high range element; a low range fluid motor for the low range element and having a cylinder and a differential-area piston therein presenting a relatively small-area to fluid pressure for engagement of the low range device and a relatively large-area to fluid pressure for disengagement of said low range element; a fluid pressure source; a first fluid line connecting said source to the high range motor; a second fluid line connecting said source to the low range motor at the small-area side of the piston; a fluid line connecting the first fluid line to the low range motor at the large-area side of the piston; and valve means for directing fluid selectively to the second line alone to effect engagement of the low range element or to all lines to simultaneously engage the high range element and disengage the low range element.

7. A change-speed transmission, comprising: a speed section including drive mechanism selectively settable to produce a plurality of basic speed ratios; a range section upstream of the speed section and including an input shaft, an output shaft connected to the drive mechanism, and low and high range elements selectively engageable between the input and output shafts to double the speed ratios; a high range fluid motor for engaging and disengaging the high range element; a low range fluid motor for the low range element and having a cylinder and a differential-area piston therein presenting a relatively small-area to fluid pressure for engagement of the low range device and a relatively large area to fluid pressure for disengagement of said low-range element; a fluid pressure source; and fluid-conducting means including a valve for selectively directing fluid under pressure to the small-area side of said piston to engage the low-range element or in parallel to the high range motor and to both sides of the low range motor so as to engage the high range element while disengaging the low-range element.

8. In a change-speed transmission having first and second selectively engageable and disengageable drive elements, the improvement comprising: a first fluid motor for engaging the first element; a second fluid motor including a differential piston presenting a small area to receive fluid under pressure to engage the second element and presenting a large area to fluid pressure for disengaging said second element; and fluid pressure means including a valve for directing fluid under pressure solely to the small-area side of the second motor piston for engaging the second element or simultaneously to the first motor and to both sides of the second motor piston for engaging the first element and disengaging the second element.

9. A change-speed transmission, comprising: a speed section including drive mechanism selectively settable to produce a plurality of basic speed ratios; a range section upstream of the speed section and including an input shaft, an output shaft connected to the drive mechanism, and high, low and reverse drive elements selectively operative between the input and output shafts to respectively produce high, low and reverse variations in said speed ratios; high, low and reverse fluid motors for respectively effectuating said elements; a fluid pressure source; a forward valve biased to an inactive position cutting out the high and low motors and having high and low motor outlets, a pair of inlets and a fluid-pressure-receivable chamber effective to shift said valve to an active position connecting one inlet to the low motor outlet and the other inlet to the high motor outlet; a direction valve having an inlet connected to the pressure source and shiftable between a reverse position connecting said inlet exclusively to the reverse motor and a forward position connecting said inlet exclusively to the forward valve chamber so as to shift said forward valve to its active position; and a selector valve for directing fluid under pressure selectively to either of said forward valve inlets while said forward valve is in its active position whereby to selectively effectuate the high and low drive elements.

10. A change-speed transmission, comprising: a speed section including drive mechanism selectively settable to produce a plurality of basic speed ratios; a range section upstream of the speed section and including an input shaft, an output shaft connected to the drive mechanism, and high, low and reverse drive elements selectively operative between the input and output shafts to respectively produce high, low and reverse variations in said speed ratios; high, low and reverse fluid motors for respectively effectuating said elements; a fluid pressure source; a forward valve biased to an inactive position cutting out the high and low motors and having high and low motor outlets, a pair of inlets and a fluid-pressure-receivable chamber effective to shift said valve to an active position connecting one inlet to the low motor outlet and the other inlet to the high motor outlet; a direction valve having an inlet connected to the pressure source, a reverse motor outlet connected to the reverse motor and a chamber outlet connected to the forward valve chamber, said direction valve having a neutral position cutting off both of its outlets from its inlet and shiftable from said neutral position to either a reverse position connecting said inlet exclusively to the reverse motor or a forward position connecting said inlet exclusively to the forward valve chamber so as to shift said forward valve to its active position; and a selector valve for directing fluid under pressure selectively to either of said forward valve inlets while said forward valve is in its active position whereby to selectively effectuate the high and low drive elements.

11. A change-speed transmission, comprising: a speed section including drive mechanism selectively settable to produce a plurality of basic speed ratios; a range section upstream of the speed section and including an input shaft, an output shaft connected to the drive mechanism, and high, low and reverse drive elements selectively operative between the input and output shafts to respectively produce high, low and reverse variations in said speed ratios; high, low and reverse fluid motors for respectively effectuating said elements; a fluid pressure source; a forward valve biased to an inactive position cutting out the high and low motors and having high and low motor outlets and a pair of inlets, said valve being shiftable to an active position connecting one inlet to the high motor outlet and the other inlet to the low motor outlet; a direction valve shiftable between a reverse position directing source pressure exclusively to the reverse motor and a forward position causing source pressure to shift the forward valve to its active position; and a selector valve for directing fluid under pressure selectively to either of said forward valve inlets while said forward valve is in its active position whereby to selectively effectuate the high and low drive elements.

12. A change-speed transmission, comprising: a speed section including drive mechanism selectively settable to produce a plurality of basic speed ratios; a range section upstream of the speed section and including an input shaft, an output shaft connected to the drive mechanism, and high, low and reverse drive elements selectively operative between the input and output shafts to respectively produce high, low and reverse variations in said speed ratios; high, low and reverse fluid motors for respectively effectuating said elements; a fluid pressure source; a forward valve biased to an inactive position cutting out the high and low motors and having high and low motor outlets and a pair of inlets, said valve being shiftable to an active position connecting one inlet to the high motor outlet and the other inlet to the low motor outlet; a direction valve shiftable between a reverse position directing source pressure exclusively to the reverse motor and a forward position cutting off source pressure from said reverse motor; means responsive to shifting of the direction valve to its forward position for shifting the forward valve to its active position; and a selector valve for directing fluid under pressure selectively to either of said forward valve inlets while said forward valve is in its active position whereby to selectively effectuate the high and low drive elements.

13. A change-speed transmission, comprising: front and rear serially connected planetary units, each having a clutch and a brake and said clutches and brakes being selectively engageable in paired combinations of front brake-rear clutch, front clutch-rear clutch, front brake-rear brake, and front clutch rear brake to produce four ascending speeds in the order named; a fluid pressure source; front and rear brake-operating fluid motors of the differential type, each having small and large areas respectively pressurizible by the fluid source to respectively engage and disengage the associated brake; fluid-conducting means connecting the small areas to the pressure source; front and rear clutch-operating fluid motors; a rear pressure line between the source and the rear clutch motor and including a branch to the large area of the rear brake motor; a rear shift valve initially in an open position in the rear line and connecting said line to the source for simultaneously pressurizing the rear clutch motor and the large area of the rear brake motor so as to engage the rear clutch and disengage the rear brake, said valve being movable to a closed position disconnecting said line from the source; a front pressure line between the source and the front clutch motor and having a branch to the large area of the front brake motor; a front shift valve initially in a closed position disconnecting said front line from the source whereby the front brake is engaged and the front clutch is disengaged, said front shift valve being movable to an open position connecting said front line to the source so as to pressurize the front clutch motor and the large side of the front brake motor so as to engage the front clutch and disengage the front brake; and control means for selectively moving the shift valves between their open and closed positions.

14. The invention defined in claim 13, in which: the control means includes fluid-pressurizible operators disposed at opposite sides of each shift valve; and control valve means for selectively pressurizing said operators to shift the associated shift valves between their open and closed positions.

15. The invention defined in claim 13, in which: the control means includes a plurality of fluid-pressurizible operators for the shift valves, including opening and closing operators for each shift valve, and activating means for alternately pressurizing only the front shift valve operators while the rear shift valve is open, said activating means being selectively operative to close the rear shift valve via the rear shift valve closing operator and to alternately pressurize only the front shift valve operators while rear shift valve is closed, and said activating means being further operative to reopen the rear shift valve via the rear shift valve opening operator.

References Cited in the file of this patent

UNITED STATES PATENTS

| | | |
|---|---|---|
| 2,697,368 | Winther et al. | Dec. 21, 1954 |
| 2,768,534 | Orr | Oct. 30, 1956 |